May 6, 1958 C. D. LAKE ET AL 2,833,387

SERIAL PRINTER

Filed April 5, 1955 4 Sheets-Sheet 1

INVENTOR.
CLAIR D. LAKE
MICHAEL FIEHL
MORTIMER L. ROGERS

BY William Lang
ATTORNEY

INVENTOR.
CLAIR D. LAKE
MICHAEL FIEHL
MORTIMER L. ROGERS
BY
William Lang
ATTORNEY May 6, 1958 C. D. LAKE ET AL 2,833,387

SERIAL PRINTER

Filed April 5, 1955 4 Sheets-Sheet 3

INVENTOR.
CLAIR D. LAKE
MICHAEL FIEHL
MORTIMER L. ROGERS

BY William Lang
ATTORNEY

INVENTOR.
CLAIR D. LAKE
MICHAEL FIEHL
MORTIMER L. ROGERS
BY William Lang
ATTORNEY United States Patent Office 2,833,387

Patented May 6, 1958

2,833,387

SERIAL PRINTER

Clair D. Lake, Binghamton, Michael Fiehl, Endicott, and Mortimer L. Rogers, Vestal, N. Y., assignors to International Business Machines Corporation, New York, N. Y., a corporation of New York Application April 5, 1955, Serial No. 499,266

5 Claims. (Cl. 197—14)

This invention relates to a printing mechanism for serial printing and more particularly to a new and improved method of arranging and power operating the type bars in such a mechanism.

The principal object of the present invention is to provide a low cost serial printer capable of reliable operation over long periods of time.

In achieving this object the type bars of the disclosed embodiment are arranged in a circle around a centrally located print position. An actuating disc mounted coaxial with the circular arrangement of type bars is power reciprocated toward and away from this print position. Interposed between the individual type bars and the reciprocated disc are a plurality of devices selectively operable to couple the individual type bars to the actuating disc to effect printing at the print position. The actuating disc is also effective to ensure that the type bars are positively restored.

Accordingly, an object of the invention is to provide a printing mechanism which utilizes a power reciprocated plate as a type bar actuator.

Another object of the invention resides in the provision of a simple mechanism to transmit the motion of a power reciprocated disc to a selected type bar to cause the type bar to undergo a print stroke and be positively restored.

A further object of the invention resides in the arrangement of a plurality of type bars in a circle around a centrally located print position, each of the type bars being selectively actuable by a power reciprocated disc.

Another object is to provide a relatively high speed serial printer wherein a continuously driven actuating member is effective to actuate a selected type bar to print and then to positively restore that type bar before the next selected type bar is actuated.

Another object of the invention resides in the arrangement of a plurality of type bar operating devices in a circle around a periphery of a power reciprocated disc whereby the engagement of the individual type bar operating devices with the disc will impart a print stroke to the associated type bar.

Other objects of the invention will be pointed out in the following description and claims and illustrated in the accompanying drawings, which disclose, by way of example, the principle of the invention and the best mode, which has been contemplated, of applying that principle.

Figure 1:
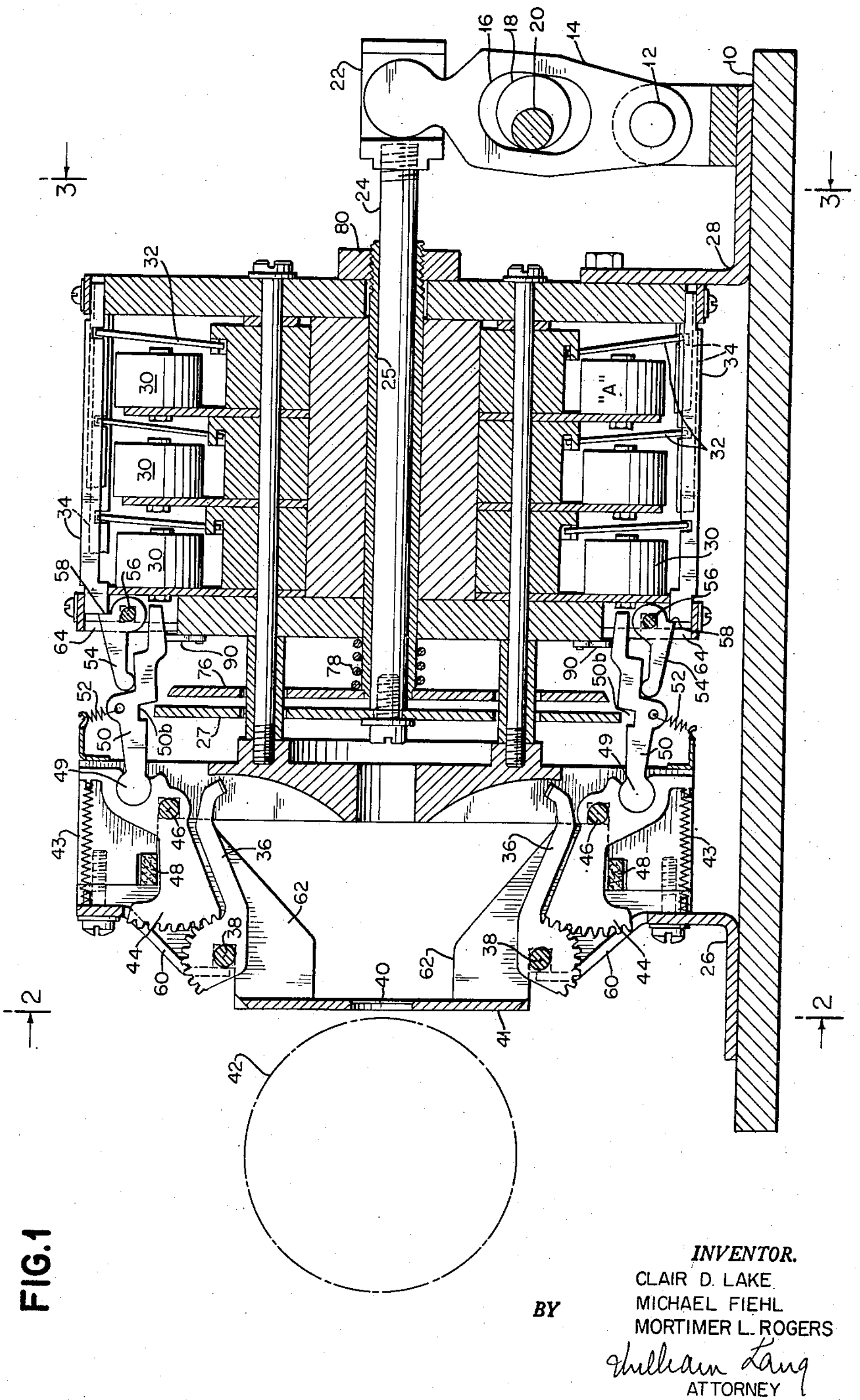
Fig. 1 is a sectional elevation taken through the center of the printing mechanism.

Figs. 4*a*, 4*b*, 4*c* and 4*d* are positional views of parts shown in Fig. 1.

Figure 5:
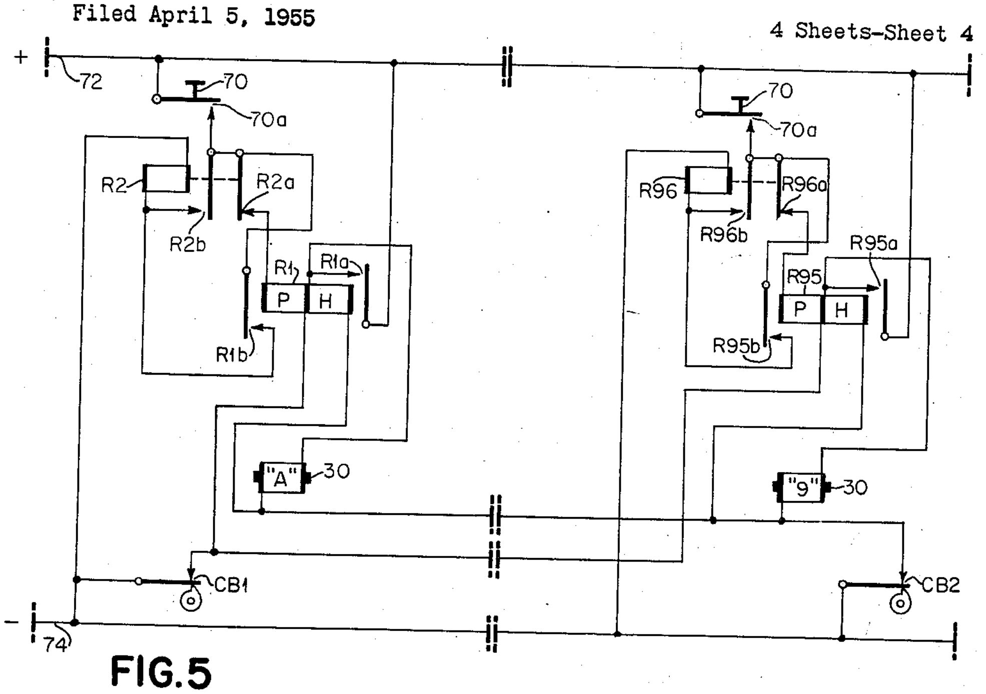

Fig. 5 is a wiring diagram of the circuits used to control the printing mechanism.

Figure 6:
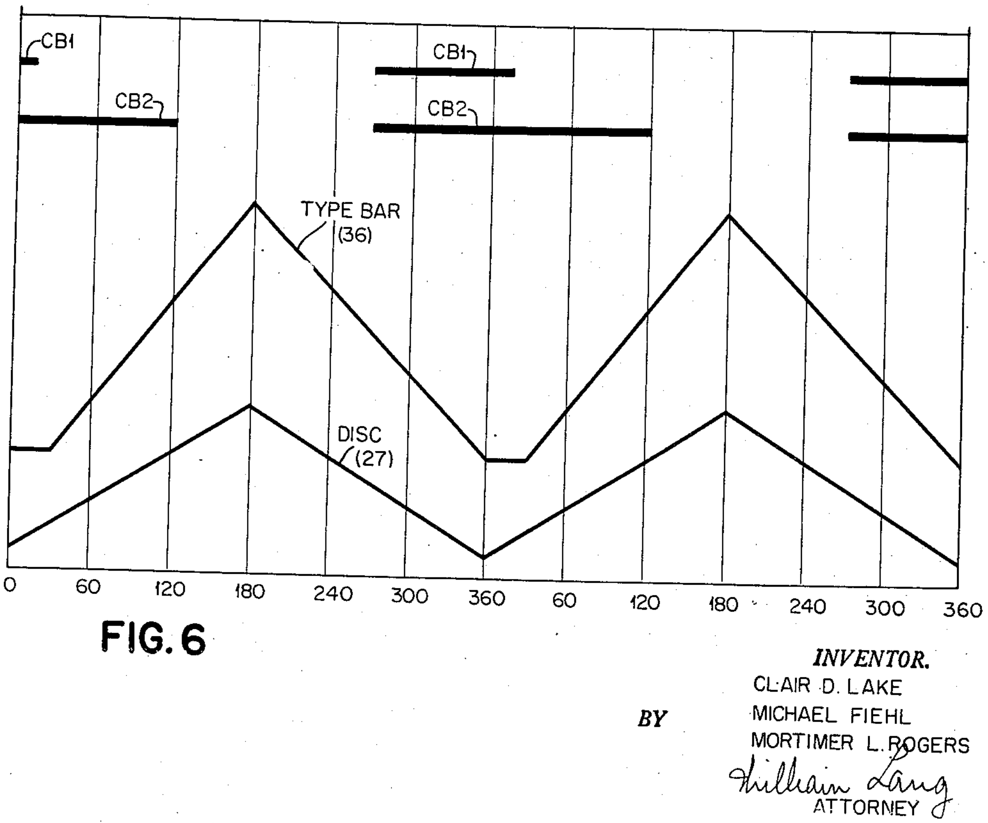

Fig. 6 is a timing chart showing the relationship between the electrical control impulses and the mechanical movement of the parts during two consecutive cycles of operation.

Figure 2:
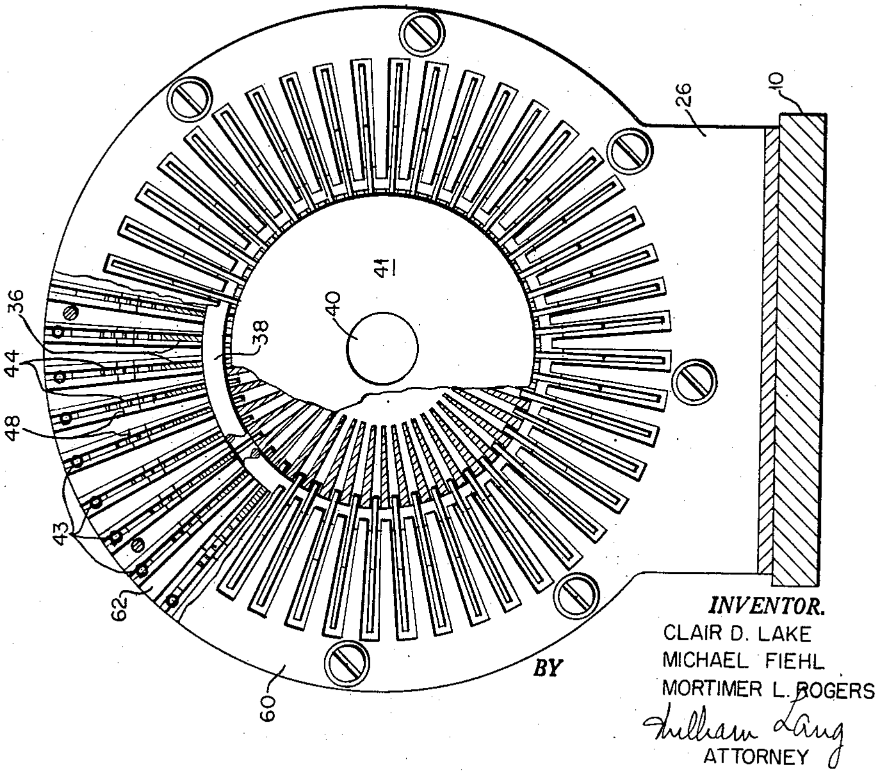
Fig. 2 is a side elevation looking in the direction of lines 2—2 on Fig. 1, with part of the outer structure broken away to show the interior construction.

Referring now to the drawings and in particular to Fig. 1, 10 represents a base member on which the printer embodying the invention is supported. Pivotally connected to the base 10 at 12 is a crank 14 having a slot 16 through which extends transverse shaft 20 carrying an eccentric 18. Shaft 20 is continuously driven in a counterclockwise direction by a suitable source of power not shown. The rotation of the eccentric 18 in the slot 16 is effective to oscillate crank 14 about the pivot 12. Crank 14 is connected at its upper end to a cross head 22 to which is secured a rod 24. The rod 24 is mounted for reciprocation in a sleeve 25 extending through the center of a cylinder-like frame assembly supported on the base 10 between flange members 26 and 28 (see also Figs. 2 and 3). Secured to the left hand extremity of rod 24 is a disc 27 which is reciprocated with the rod due to the oscillation of crank 14 by the eccentric 18 carried on continuously rotating shaft 20.

Figure 3:
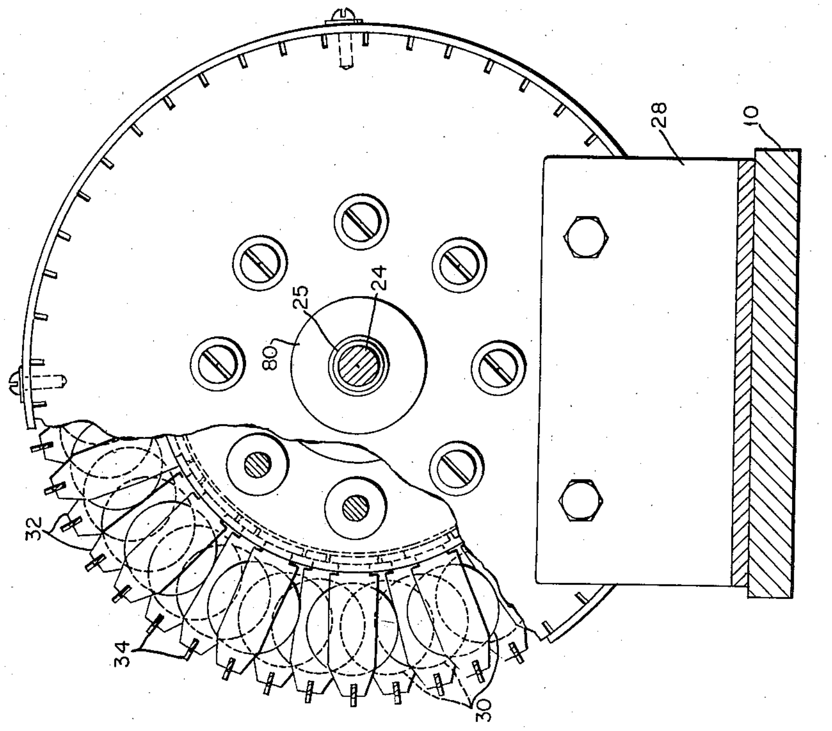
Fig. 3 is a side elevation looking in the direction of lines 3—3 on Fig. 1, with part of the outer structure broken away to show the interior construction.

Mounted concentric with the rod 24 are three circular rows of magnets 30, the magnets in each row as is shown in Fig. 3 being staggered in relationship to those in the other rows. Adjacent to each magnet 30 there is mounted an armature 32 which extends outwardly to engage a slot in one of a group of slides 34 mounted external to the rows of magnets. The slides 34 associated with each of the magnets 30 in the three rows are arranged alternately around a periphery of the frame and form as is shown in Fig. 3 a circle coaxial with rod 24.

There are forty-eight magnets 30, all told, sixteen in each of the three rows and these magnets are selectively energized in a manner later to be described to control operation of forty-eight individual type bars 36, each carrying an alphabetic, numeric or special character. The type bars 36 are pivotally mounted on a circular rod 38 carried in the frame and are arranged to form a circle around an opening 40 in cover plate 41 adjacent to a print position on a platen 42. Each of the type bars 36 has a toothed portion which meshes with a corresponding portion on one of a group of sectors 44 similarly mounted on circlar rod 46. Compression springs 43, which are associated with each of the sectors 44 and urge the sectors against a cushioned back stop 48, normally hold the sectors 44 and meshing type bars 36 in the home position shown in Fig. 1.

Pivotally carried on each of the sectors 44 is one of a circular arrangement of interposers 50. These interposers 50 are all urged away from the center of the mechanism, as defined by rod 24, by tension springs 52 and each abuts against one of a like circular arrangement on bell cranks 54 pivotally carried on rod 56. Each of the bell cranks 54 has a surface 58 which abuts against one of the circularly arranged slides 34 and due to the action of springs 52, the slides 34 and associated armatures 32 are normally urged to the inoperative position shown in Fig. 1. A slotted cover plate 60 (see also Fig. 2) and radial combs 62 and 64 serve to guide the movement of the parts during the printing operations now to be described.

If at 0° of the first cycle shown in Fig. 6, at which time the parts will be essentially in the position shown in Fig. 1 the key 70 associated with the circuitry for the "A" print magnet 30 (Fig. 5), is depressed, the operation will be as follows.

Depression of the key 70 will close the associated contacts **70*a* to complete a circuit to energize relay R1 which circuit extends from a plus potential line 72 through the closed contacts 70*a***, relay contacts R2*a*, the pick coil of relay R1 and cam contacts CB1, closed at this time, to a negative potential line 74. Once energized, relay R1 will be held energized until 120° in the cycle by a circuit extending from plus line 72 through the transferred R1*a* contacts, the hold coil of relay R1 and cam contacts CB2 to line 74. The "A" print magnet 30 will be energized and held energized until 120° by a parallel circuit through the transferred contacts R1*a* and under control of cam contacts CB2.

Since it is possible that the key 70 might be held depressed into the next succeeding cycle of operation circuity is provided to ensure that a single depression of the key 70 will effect only a single energization of an associated printing magnet 30. Thus continued depression of the key 70 after relay R1 is energized and held energized in parallel with the print magnet 30, will cause energization of relay R2 by a circuit extending from line 72 through the closed key contacts 70*a*, the transferred relay contacts R1*b* and the coil of relay R2 directly to the negative potential line 74. Relay R2 will be held energized as long as they key is held depressed by a circuit extending from line 72 through the closed key contacts 70*a*, relay contacts R2*b* transferred, and the coil of relay R2 to the negative potential line 74. The energization of relay R2 will open the contacts R2*a* which are in the energization circuit to the pick coil of relay R1. Thus until the key 70 is released and relay R2 is deenergized, the pick coil of relay R1 cannot be reenergized and the hold coil of relay R1 and the print magnet 30 will remain energized only until 120° of the cycle and cannot be reenergized until the key 70 has been released and subsequently depressed at a time (270° to 20°) when contacts CB1 are closed.

Referring again to Fig. 1 and also to the positional view of Figs. 4*a*, 4*b*, 4*c* and 4*d* the manner of effecting printing of the letter "A" as a result of the above explained energization of the "A" print magnet 30 will now be explained. Energization of the "A" magnet 30 will by attraction pivot its armature 32 clockwise (Fig. 1). This pivoting will, through the engagement with the slot in the associated slide 34, move the slide to the left against the surface 58 on the associated bell crank 54. This movement of the slide 34 against the bell crank will pivot the bell crank 54 clockwise about rod 56 causing the oppositely extending end of the bell crank to position the associated interposer 50 toward the centrally located actuating disc 27 and bring the notch 50*b* in the interposer into engagement with the disc 27 as is shown in Fig. 4*a*. A plurality of washer-like interlocks 90 are mounted in a circle adjacent to the circular arrangement of interposers 50. These interlocks 90 have sufficient play to allow operation of only one interposer 50 toward the actuating disc 27 at a time. Accordingly these interlocks will prevent erroneous machine operations when two keys 70 are depressed at the same time. As the continuously reciprocated disc 27 is moved to the left during the cycle under consideration it will carry with it the engaged interposer 50. Movement of the interposer 50 to the left will through its pivoting connection 49 with the associated sector 44 cause the sector to be pivoted clockwise around rod 46 against the urging of spring 43. The associated type bar 36 being meshed with the sector will be pivoted counterclockwise toward the print position on the platen 42.

Figures 4B, 4D:
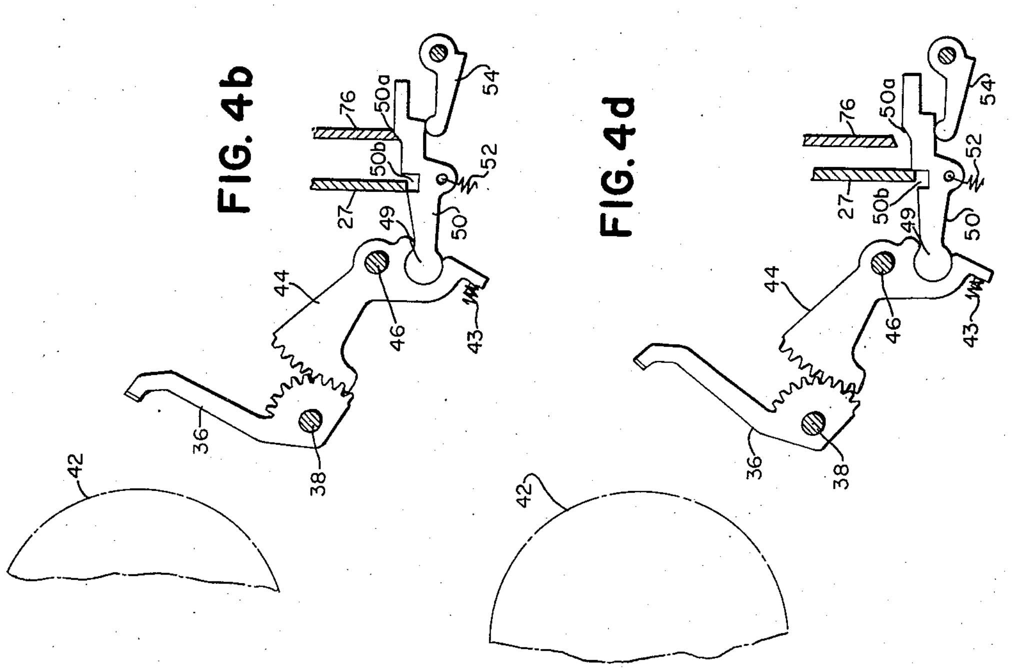
Figures 4A, 4C:
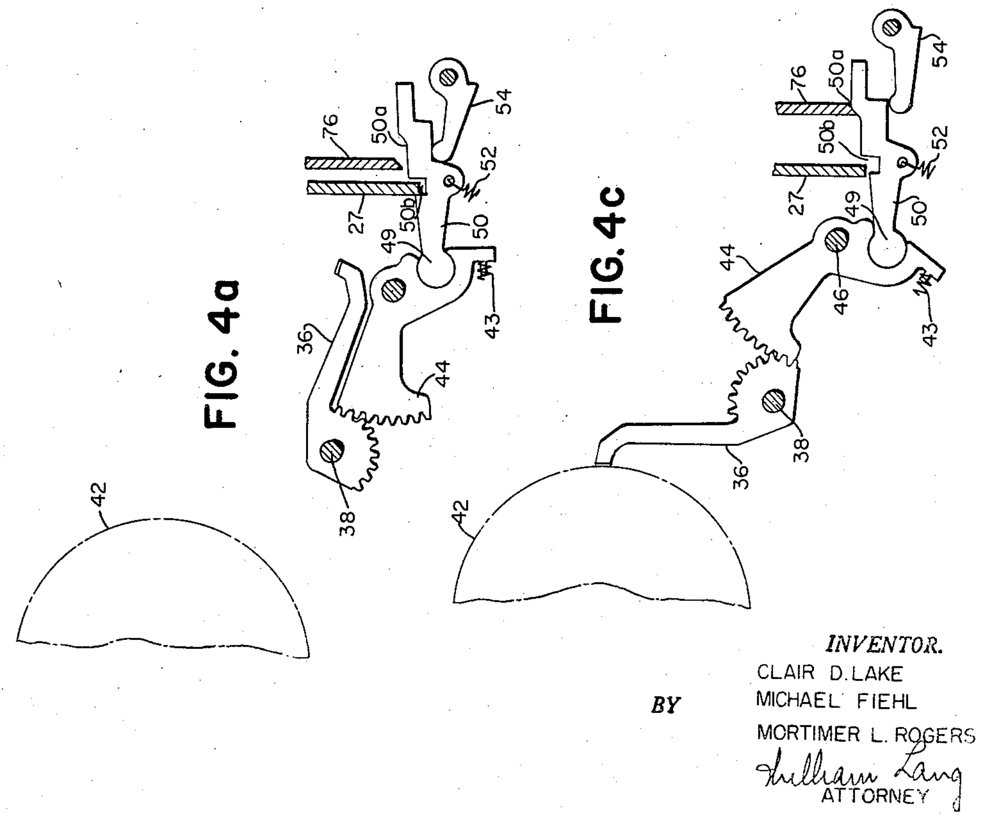

The continuous movement of the disc 27 toward the print position will bring the parts to the position shown in Fig. 4*b* at approximately 120° of machine cycle time. At this time cam contacts CB2 are opened to deenergize relay R1 and print magnet 30, which deenergization will free the interposer 50 and bell crank 54 to move away from the disc 27 under the action of tension spring 52. In order to ensure disengagement of the interposer 50 from the actuating disc 27, the knock-off disc 76 attached to sleeve 25 is provided. This knock-off disc 76 is located to engage the cam surface 50*a* on the interposer 50 and cause continuous movement of the interposer to the left to cam it out of engagement with the actuating disc 27. The disengagement of the interposer 50 from the actuating disc 27 breaks the driving connection to the type bar 36 and allows it to continue its motion to the print position on the platen 42 under its own inertia (Fig. 4*c*.)

The knock-off disc 76 is attached to the sleeve 25, the parts being urged to the left by compression spring 78 and adjustable in either direction by the adjusting nut 80 which is carried by the opposite end of the sleeve. The adjusting of knock-off disc 76 provides a means for controlling the printing impression, since varying the point at which the interposer 50 is disengaged from the actuating disc 27 will increase or decrease, according to the adjustment, the distance through which the type bar is positively driven and thus correspondingly increase or decrease the amount of inertia imparted to the type bar.

Once the type bar 36 has reached the platen (Fig. 4*c*) and spent its inertia in effecting printing, the compression spring 43 acting upon the sector 44 will be effective to begin to restore the type bar back to its home position. At the same time, the continued rotation of shaft 20 and eccentric 18 will also cause the rod 24 and attached actuating disc 27 to begin their movement to the right away from the print position on the platen 42. In order to ensure positive restoration of the type bar, the notch 50*b* in the interposer 50 is so constructed that its right end edge is in the path of the actuating disc even when the interposer has been restored to its inoperative position. Thus as the actuating disc 27 is moved to the right, it will engage the right edge of the notch 50*b* (Fig. 4*d*), and this engagement coupled with the action of springs 43 and 52 will be effective to positively restore the parts to the original position of Fig. 1. The utilization of the reverse movement of the actuating disc to positively restore the type bars obviates the possibility of interference between one type bar as it is restored and the next operated type bar as it is moved to the printing position.

In the manner above described, the depression of the key 70 for the "A" print magnet 30 at approximately zero degrees of this cycle has been shown to be effective to cause a print stroke to be imparted to the corresponding type bar. Referring to Fig. 6, it can be understood that further printing may be accomplished during the next cycle by depression of a key 70 corresponding to the desired character at any time between 270° of this first cycle and 20° of the next cycle during which the printing is to be effected. As before explained, depression of key 70*a* will cause energization of the associated print magnet 30 and positioning of the associated interposer 50 toward the centrally located actuating disc 27. Since the selected print magnet 30 will be held energized until 120° of this subsequent cycle, the interposer 50 will be held in the position of Fig. 4*a* as the actuating disc completes its stroke to the right and begins its motion to the left toward the print position on platen 42. Thus shortly after zero degrees of this second cycle, the actuating disc 27 will engage the notch 50*b* in the positioned interposer 50 (Fig. 4*a*) and printing and restoration will be effected in the manner above described. Spacing mechanism not shown here but of a type well known in the art is provided to control the platen 42 to be spaced between successive printing operations.

We claim:

1. In a mechanism for printing serially at a common print position, a reciprocable actuating disc, a plurality of type bars pivotally mounted in a circle coaxial to said actuating disc, said type bars being normally biased away from the print position but operable thereto to print and retractable therefrom, means for reciprocating said actuating disc axially toward and away from the print position, and a plurality of devices each associated with a different type bar and selectively operable to connect the different type bars to the actuating disc for operation to the print position, each of said devices being also effective when the associated type bar has been operated to the print position to connect the operated type bar to the actuating disc for positive retraction from the print position.

2. In a mechanism for printing serially at a common print position, a plurality of type bars normally biased in a circular arrangement around the print position but operable to the print position to print and retractable therefrom, an actuating disc coaxial with the circular arrangement of type bars, means for reciprocating said actuating disc axially toward and away from the print position, a plurality of positionable type bar operating devices each associated with a corresponding type bar for operating said type bar to the print position and retracting it therefrom, a plurality of control devices each associated with a corresponding type bar operating device and actuable to position said type bar operating device for engagement with said actuating disc as it is moved toward the print position to cause operation of the corresponding type bar to the print position, and means for disengaging said type bar operating device from said actuating disc before the associated type bar reaches the print position, the inertia imparted to the type bar being effective to carry it to the print position, said type bar operating device being normally engageable with said actuating disc as it is moved away from the print position to cause retraction of the operated type bar away from the print position.

3. The invention as set forth in claim 2 wherein each type bar operating device includes a movable interposer having an irregular slotted portion, the slotted interposers being arranged around the periphery of said actuating disc and normally biased away from said disc, said control devices being effective to position a corresponding slotted interposer toward the disc to cause engagement of the slotted portion of the interposer with the disc as said disc is moved toward the print position, the irregular slot in said interposers being normally engageable with said disc as the disc is moved away from the printing position.

4. In a mechanism for printing serially at a common print position, a reciprocable actuating member, a plurality of pivotally mounted type bars each normally biased in a home position away from said print position but operable thereto to print and retractable therefrom, means for continuously power reciprocating said actuating member, a plurality of interposers each coupled to a different one of said type bars and each controllable to engage said actuating member to thereby connect the coupled type bar to said actuating member, and means for controlling a first one of said interposers to connect a first one of said type bars to said actuating member during a first reciprocation of said member and for controlling a second one of said interposers to connect a second one of said type bars to said actuating member during the next succeeding reciprocation of said member, said actuating member being effective by engagement with said first and second interposers during said first and next succeeding reciprocations, respectively, to operate said first and second type bars to the print position to print and during said first reciprocation by engagement with said first interposed to positively retract said first type bar to its home position before the operation of said second type bar by said actuating member is initiated.

5. In a mechanism for printing serially at a common print position, a reciprocable actuating member, a plurality of pivotally mounted type bars normally biased in a home position away from said print position but operable thereto to print and retractable therefrom, means for continuously power reciprocating said actuating member, a plurality of interposers each coupled to a different one of said type bars and controllable to engage said actuating member to thereby connect the coupled type bar to said actuating member, means for controlling a first one of said interposers to connect a first one of said type bars to said actuating member during a first reciprocation of said member and for controlling a second one of said interposers to connect a second one of said type bars to said actuating member during the next succeeding reciprocation of said member, said actuating member being effective by engagement with said first and second interposers during said first and next succeeding reciprocations, respectively, to operate said first and second type bars to the print position to print, and means for disengaging said first interposer from said actuating member before said first type bar reaches the print position during said first reciprocation, the inertia imparted to said first type bar being effective to carry it to the print position to print, said first interposer being effective to engage said actuating member after said first type bar has reached said print position to connect said first type bar to said actuating member to render said member effective to positively retract said first type bar to its home position before the operation of said second type bar by said actuating member is initiated.

References Cited in the file of this patent

UNITED STATES PATENTS

| | | |
|---|---|---|
| 560,573 | Davis | May 19, 1896 |
| 633,826 | Fox et al. | Sept. 26, 1899 |
| 654,133 | Cahill | July 24, 1900 |
| 747,485 | Roberts | Dec. 22, 1903 |
| 954,581 | Paul | Apr. 12, 1910 |
| 2,308,461 | Talley | Jan. 12, 1943 |